Feb. 19, 1935.  B. C. PLACE  1,992,093
SPRING FASTENER
Filed March 9, 1931  2 Sheets-Sheet 1
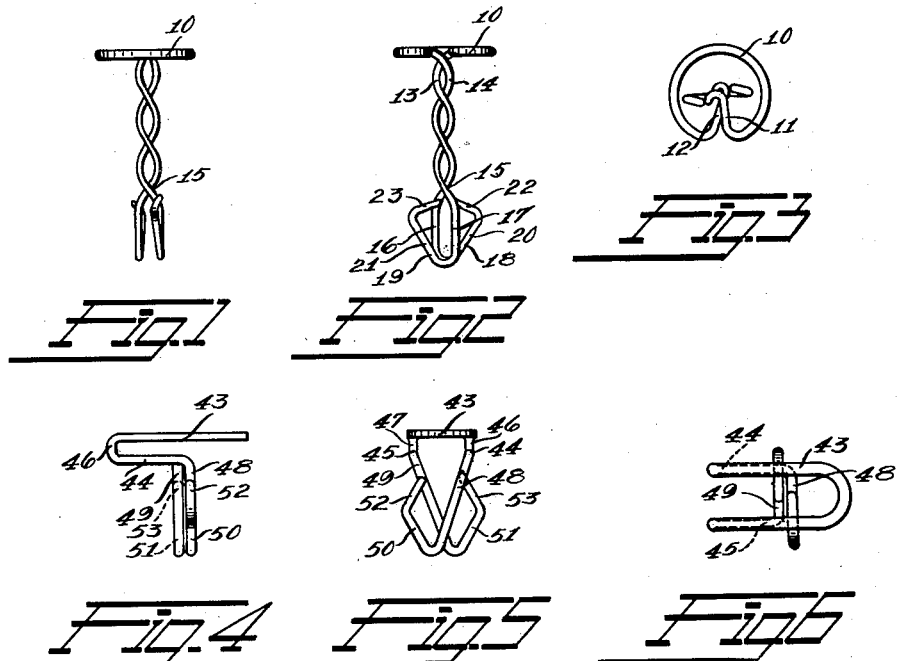
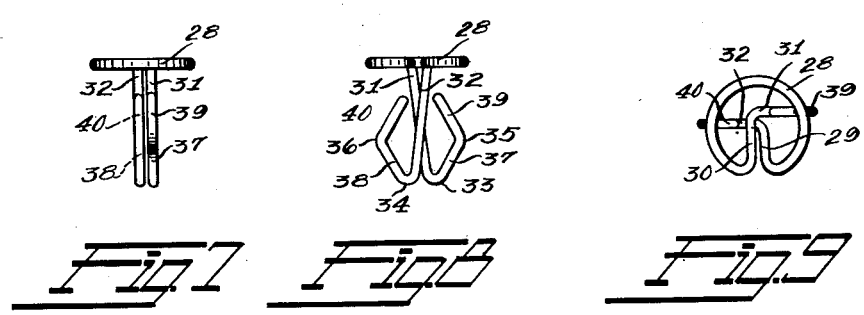
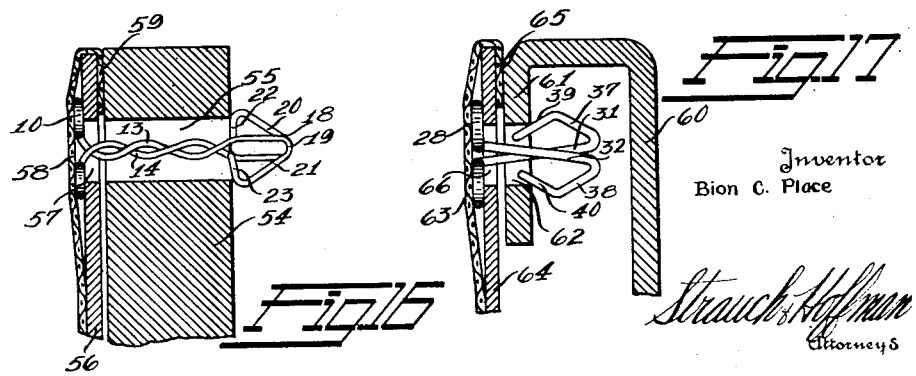
Inventor
Bion C. Place Feb. 19, 1935. B. C. PLACE 1,992,093
SPRING FASTENER
Filed March 9, 1931 2 Sheets-Sheet 2

Inventor
Bion C. Place
By Strauch & Hoffman
Attorneys

Patented Feb. 19, 1935

1,992,093

UNITED STATES PATENT OFFICE 1,992,093

SPRING FASTENER

Bion C. Place, Detroit, Mich., assignor of one-half to George E. Gagnier, Detroit, Mich.

Application March 9, 1931, Serial No. 521,334

18 Claims. (Cl. 24—215)

This invention relates to spring fasteners of the type that may be entered in an aperture and socket by means of a straight line movement, the fastener being contracted during the movement thereof into said aperture or socket after which it automatically expands in the socket to prevent ready withdrawal thereof.

More particularly, the invention relates to a one-piece wire fastener of the kind just stated, in which the fastener which consists of a head and a shank, is formed from different portions of a single piece of spring wire in such a way as to provide separate abutments to engage the socket or aperture in the supporting structure, which abutments may be spaced any desired distance from the head.

In my Patent #1,679,266 granted July 31, 1928, I have described a one-piece wire spring fastener that is peculiarly adapted to secure relatively thin sheets of trim material of any character to a supporting structure which provides holding shoulders that are not spaced a substantial distance from the surface of the trim material. This invention aims to provide a fastener of the character described in said patent that is, however, adapted for use in situations in which a long shank fastener is required; that is, in situations in which the fastener of my patent can not be effectively used because of the necessity that the holding portions thereof be relatively sharply inclined divergently to give the fastener the necessary holding power.

A further object of the invention is to provide a fastener of the type that can be used to secure trim material to a supporting structure by passing the fastener through approximately alined apertures in the trim material and in the supporting structure, irrespective of the exact alinement of the apertures, having abutments carried by spring arms that pass completely through the apertures, which arms are bent toward the head of the fastener to provide said abutments.

A further object of the invention is to provide a spring fastener made of wire in which the shank of the fastener consists of crossed arms, each of which carries an abutment shaped to firmly hold the fastener from withdrawal after it has been entered in a socket or aperture of a supporting structure.

Another object of the invention is to provide a fastener constructed so as to provide a high degree of contractibility in the shank so that said shank can include abutments of relatively wide lateral extent that will engage a shoulder or shoulders of a socket or its equivalent over a substantial surface or area laterally of the opening in the socket or supporting structure through which said shank is passed.

This invention also aims to provide a wire fastener of the snap type in which the abutments that serve to hold the fastener in operative position are carried by arms twisted together throughout a portion of their length, which arms are free of interconnection a substantial distance inwardly of the portion thereof that first enters the socket, and in which said arms, when moved toward each other in entering the socket or aperture, are caused to press against and support each other, and in which such movement of the arms has a tendency to cause an increase in the twist of said arms, whereby the resilience of the arms is enhanced by the inherent tendency of said arms to return to their normal untwisted condition, where maintained free of twisted or similar interconnection in the course of manufacture of the fastener.

Still another object of the invention is to provide a spring fastener of the headed or stud type having a construction that inherently permits of the increase in length of the shank of the fastener without loss in the effectiveness of the holding power of the fastener.

Further objects of the invention will appear as a description thereof proceeds with reference to the accompanying drawings in which:

Figure 1 is a side view of a fastener constructed in accordance with this invention.

Figure 2 is a side view looking towards the left in Figure 1.

Figure 3 is a plan view of the invention shown in Figures 1 and 2.

Figures 4, 5 and 6 are, respectively, side elevations, an end view, and a plan view of a modified form of fastener.

Figures 7, 8 and 9 are, respectively, a side elevation, an end elevation, and a plan view of a still further modification.

Figure 16 is a sectional view showing one manner of using the fastener of Figures 1, 2 and 3.

Figure 17 is a fragmentary sectional view showing one way of using the fastener illustrated in Figures 7, 8 and 9.

Like reference characters indicate like parts throughout the several figures.

Figure 10:
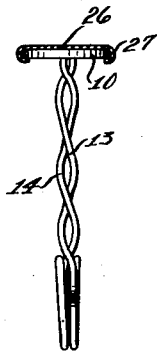
Figures 10, 11 and 12 are, respectively, a side view, an end view, and a plan view of a fastener similar to Figure 1, but showing a slight modification and including metallic caps for the head of the fastener, the cap being shown in section in Figures 10 and 11.

Referring to Figures 1, 2 and 3, a one-piece wire fastener is disclosed which may be used to secure covering material, to a relatively thick wall, for example. The fastener is constructed from a single piece of wire, the mid-portion of which is bent into suitable form to constitute the head 10 of the fastener. Said head may be in the form of a circular loop, as illustrated in the drawings, or it may assume any other convenient form. The portions of the wire adjacent that from which the loop 10 is formed are then carried inwardly approximately in the plane of the head 10 to form portions 11 and 12 that extend toward the center of the loop. The ends of the wire are then bent approximately at right angles to the portions 11 and 12 to form arms 13 and 14 of relatively great length. The arms 13 and 14 may be twisted together for a substantial distance from the head 10 toward the end of the shank of the fastener. In the drawings, arms 13 and 14 are twisted together to a point 15 (Figure 2) spaced a substantial distance from the end of the shank of the fastener, providing portions 16 and 17 disposed side by side, that are capable of substantial movement in a direction transverse to the length of the shank of the fastener. The point 15 at which the twisting together of the arms 13 and 14 terminates may vary in accordance with the length of the shank of the fastener, a greater number of twists being formed between the arms 13 and 14 in the shanks of fasteners of greater length. It is essential, however, that the twisting together of the arms 13 and 14 terminate at a point spaced substantially from the end of the shank of the fastener so as to provide arms 16 and 17 of sufficient length to enable the fastener to be contracted relatively freely, when it is passed through an opening or socket provided to receive it as hereinafter described.

Figure 11:
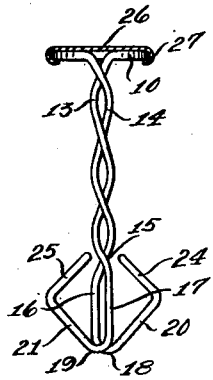
Figure 12:
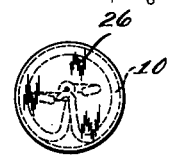

The arms 16 and 17 terminate at the end of the shank of the fastener in U-shaped ends 18 and 19 respectively. Said U-shaped ends carry the ends of the wire from which the fastener is formed toward the head 10 of the fastener providing inclined guiding portions 20 and 21 which are shaped to cause the arms 16 and 17 to swing with respect to the point 15 in parallel planes normal to the head as the shank of the fastener is contracted when it is inserted in the opening or socket provided to receive it. The inclined guiding portions 20 and 21 are connected to holding portions 22 and 23 formed by bending the tips of the wire towards each other, said holding portions providing abutments or shoulders preventing ready withdrawal of the fastener after it is applied in operative position as hereinafter described. The holding portions 22 and 23 may be bent so that they are approximately at right angles to the length of the shank of the fastener, as illustrated in Figure 2, or said holding portions may assume the form of Figure 11, in which they are turned toward the shank of the fastener to provide inclined holding portions 24 and 25, that are disposed approximately at an angle of 45° to the length of the shank of the fastener, or at any other satisfactory angle. In other respects the fastener illustrated in Figures 10, 11 and 12 is the same as that illustrated in Figures 1, 2 and 3 and like reference characters have been applied to the like parts thereof. The fastener of Figures 1, 2 and 3 provides a shoulder or abutment presenting a sharp corner to the edge of the opening or socket in which it is applied that will serve to prevent the withdrawal of the fastener from the socket or opening after it has been inserted therein by mere pulling on the head of the fastener. In the form of the invention shown in Figures 10, 11 and 12 the inclined holding portions 24 and 25 engage the portions of the socket or opening in which the fastener is applied by presenting inclined surfaces which will be effective to hold the fastener against withdrawal under ordinary conditions, but permit its withdrawal if a firm pull is exerted against the head thereof. The fastener of Figures 10, 11 and 12 may, accordingly, be more readily disassembled, than the fastener of Figures 1, 2 and 3, the latter figures illustrating a fastener that is intended for use in situations in which ready withdrawal is not contemplated.

If desired, either of the fasteners described may be provided with a sheet metal cap 26, illustrated in Figures 10, 11 and 12, having the edges 27 bent or crimped or spinning said eges over the wire constituting the head 10 of the wire fastener. Such sheet metal caps may be applied to any of the fasteners hereinafter described when desired, in order to present a neat appearing head to the view of the observer, when the fastener is applied in such a way that the head thereof is visible. The exterior surface of the cap 26 may be ornamented in any desired manner, or covered with cloth or similar material to enhance its appearance and to provide a head that will blend nicely with the material that may be secured by means of the fastener.

Figure 13:
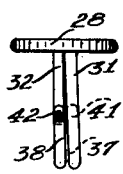
Figures 13, 14 and 15 are, respectively, a side elevation, an end view, and a plan view of a modification of the fastener shown in Figures 7, 8 and 9.
Figure 14:
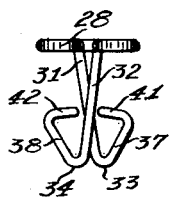
Figure 15:
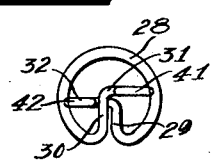

The fasteners so far described are intended as above stated for use in situations in which the shank of the fastener must assume considerable length; that is, the shoulder provided by the opening through which the fastener passes, or in any other manner, is located at a distance spaced substantially from the head of the fastener. When the shoulder with which the fastener is to be engaged is disposed relatively close to the outer surface of the covering material secured by the fastener, a one-piece wire fastener such as shown in Figures 7, 8 and 9 may be employed. The fastener of these figures is also preferably constructed from a single piece of wire, the midportion of which is bent into the form of a loop 28 constituting the head of the fastener. The portions of the wire adjacent the ends of the loop 28 are bent inwardly approximately in the plane of said loop to provide portions 29 and 30 forming a part of the head of the fastener. The ends of the wire are then turned into parallel planes approximately at right angles to the plane of the head, as shown, to provide arms 31 and 32 disposed in side by side crossed relation so that each arm 31 and 32 is capable of substantial swinging movement, which swinging movement is opposed by the torsion set up in the portions 29 and 30 from which said arms are suspended from or attached to the head of the fastener. Arms 31 and 32 extend a substantial distance away from the head, terminating in U or return bends 33 and 34 which carry the ends of the wire from which the fastener is formed from the end of the shank of the fastener toward the head 28. Said ends of the fastener are bowed outwardly as shown at 35 and 36, providing inclined guiding portions 37 and 38, which function to cause the arms to swing toward a line normal to the head of the fastener when said inclined guiding portions engage the edge of the aperture or socket in which the shank of the fastener is inserted. Beyond the guiding portions 37 and 38 the ends of the fastener provide inclined holding portions 39 and 40. The holding portions 39 and 40 may be bent so as to extend at an acute angle from the length of the shank of the fastener, and so as to present an inclined abutment to the edges of the socket or opening in which the fastener is placed, such inclined abutment permitting withdrawal of the fastener by a lengthwise pull thereon. Instead of the inclined holding portions 39 and 40 the ends of the wire constituting the fastener may be turned inwardly toward a central longitudinal axis of the shank of the fastener, as shown at 41 and 42 in Figure 14, providing relatively sharp shoulders for engagement with the edges of the socket or opening in which the fastener is inserted. The holding portions 41 and 42 are, preferably, disposed approximately at right angles to the length of the shank of the fastener, whereby it is extremely difficult or impossible to withdraw the fastener by simply applying a pull to the head thereof. In other respects, the fastener illustrated in Figures 13, 14 and 15 is the same as that illustrated in Figures 7, 8 and 9.

The fasteners so far described are provided with heads designed to contact only with the outer surface of the covering material or the like that may be secured by the fastener. If desired, any of the fasteners so far described may be provided with a head in the form of a hook designed so as to engage both sides of the material that is secured by the fastener. The particular fastener of Figures 7, 8 and 9 is shown provided with such a head in Figures 4, 5 and 6 of the drawings, in which the mid-portion of the single piece of wire of which the fastener is preferably formed, is bent in the form of a letter U 43, the legs of which preferably extend in parallelism as illustrated in Figure 6. The portion of the wire adjacent the ends of the legs of the U is then return-bent into parallelism with said legs to provide portions 44 and 45 connected to those legs of the U by short portions 46 and 47 constituting the bight of the hook-shaped head thus formed. The ends of the wire are then bent at right angles to the portions 44 and 45 providing arms 48 and 49 corresponding to the arms 31 and 32 of Figures 7, 8 and 9 before referred to. Said arms are carried to the end of the shank and the ends of the wire are then return-bent and bowed outwardly to provide guiding portions 50 and 51, and holding portions 52 and 53 corresponding respectively to the guiding portions 37 and 38 of Figure 8 and the holding portions 39 and 40 of the same figure. Preferably the fastener of Figures 4, 5 and 6 is constructed of round wire. If desired, the portions thereof that constitute the portion 43 of the hook-shaped head of the fastener is flattened so as to minimize the amount of protrusion of the head of the fastener beyond the outer surface of the material secured thereby.

The fasteners just described may be used in a number of ways and for a variety of purposes. Generally speaking, the fastener is intended for use wherever a spring snap fastener of the stud type has heretofore been used. Figures 16, 17, 18 and 19 show several preferred ways of employing the described fasteners for the purpose of securing trim material to the inside of automobile or similar bodies, for example. Figure 16 which shows one way of applying the fastener shown in Figures 1, 2 and 3 includes a supporting structure 54 which may be a structural element, such as a wooden frame member, for example, having substantial thickness. Said supporting member is provided with an opening 55 designed to receive the shank of the fastener. The trim panel comprising a foundation of cardboard or similar material 56 provided with an opening 57 permitting the passage of the fastener as shown, is secured in position by a series of said fasteners applied at intervals parallel to the edges of the cardboard foundation. Generally such foundations are provided with a fabric cover 58, the edges 59 of which are lapped around the edges of the foundation in well-known manner. The opening 57 in the foundation may be of the kind that will permit the head 10 of the fastener to be passed between the covering material and the outside of the foundation, after said covering material has been applied to the foundation, such as illustrated in my Patent #1,722,544, or the openings 57 may be so formed as to simply permit the passage of the shank of the fastener therethrough by a straight line insertion prior to the application of the fabric covering or trim material 58.

The fasteners are assembled with respect to the foundation in either of the ways just referred to and their protruding shanks are then brought opposite the openings in the supporting structure. When the fastener illustrated in Figure 16 is brought into the opening 55, the inclined guiding surfaces 20 and 21 engage the edges of the opening causing a contracting of the overall width of the shank of the fastener by bending the arms 16 and 17 from the point 15 constituting the end of the twist in the arms of the shank of the fastener. This action has a tendency to cause the arms to be twisted together further, which tendency adds to the inherent resilience of the arms 16 and 17 and their inherent tendency to spring apart when permitted to do so. The fastener is then passed completely through the opening 55, and as soon as the portions 16 and 17 of the arms 13 and 14 are free to do so, they spring apart bringing the shoulders or abutments 22 or 23 of the fastener into contact with the edges of the opening 55, as illustrated in Figure 16. The fastener is thus interlocked within the opening, and in view of the fact that the shoulders or abutments 22 or 23 are bent at a relatively sharp angle it is very difficult to remove the fastener when it is applied in such relation that the rear of the supporting structure 54 is inaccessible for contraction of the portion of the shank of the fastener that protrudes beyond the rear wall thereof. The fastener in Figures 1, 2, 3 and 16, accordingly, is designed particularly for use in situations in which it is not particularly desired to be able to remove the covering material after it is once put in place. The fastener of Figures 10, 11 and 12, provided with holding portions 24 and 25 that are inclined at an acute angle with respect to the length of the fastener is used in the same manner in which the fastener of Figures 1, 2 and 3 is used, but it will be understood that in view of the fact that more gradually inclined holding portions are presented to the corners or edges of the openings 55 in the supporting structure 54, the fastener may be removed by simply exerting a pull on the head to cause the fastener to be withdrawn reversely through the opening in which it is applied.

The supporting structure 54 may be of any thickness, the length of the shank of the fastener being made in accordance with said thickness, the arms 13 and 14 being simply lengthened to bring this about. Said arms are twisted together throughout a portion of their length to a point relatively close to the shoulders or abutments so as to limit the length of the portions 16 and 17, so that the portions 16 and 17, which are moved when the fastener enters the opening provided to receive it, may provide sufficient resilience and stiffness so that the fastener will firmly snap into place when it is brought to its operative position. In view of the inherent tendency of the arms that carry the guiding and holding portions to swing apart, it will be understood that the holding portions of the fastener exert continuous pull on the head of the fastener to cause said arms to yieldingly force the holding portions laterally so that the inclined portions thereof, cooperating with the corners of the opening through which the fastener is passed, wedge said holding portions firmly against said corners. This is effective to draw the material secured by the fastener firmly against the supporting structure.

In Figure 17, one way of using the fastener of Figures 7, 8 and 9 is disclosed, said figure illustrating a fragment of a supporting structure 60 of metallic form having a flange 61 disposed in parallelism with the body portion 60 of the supporting structure, for example. The flange 61 is provided with an opening 62 to receive the fastener which is applied by disposing the head 28 thereof between a fabric cover 63 applied to cardboard or similar foundation 64 of the panel, the edge 65 being lapped around the edges of the foundation 64 in known manner. The head 28 is passed through an opening 66 in the foundation, either prior to the application of the fabric covering 63, or by forming the opening 66 so as to permit the passage of the head 28 through the foundation in the manner of my Patent #1,722,544.

The fastener is assembled with respect to the foundation and the foundation is then applied to the supporting structure by applying pressure to the head of the fastener, and pushing the shank thereof through the opening 62. Said shank is contracted by a swinging of the arms 31 and 32 as the shank of the fastener enters the opening 62, by virtue of the fact that the inclined guiding surfaces 37 and 38 cause said arms to swing laterally reducing the width of the shank of the fastener. After the fastener has been completely entered in the opening, the arms, due to their inherent resilience, spring apart causing the inclined holding portions 39 and 40 to engage the edges or corners of the opening 62. The resilience of the arms 31 and 32 causes the application of a continuously applied yielding pressure forcing the inclined surfaces 39 and 40 against said corner or edges of the opening 62, thus exerting a wedging action between the fastener and the material so that it is secured firmly against the supporting structure.

Figure 18:
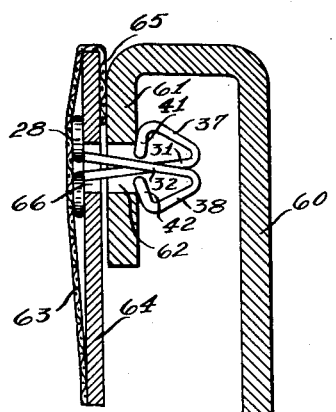
Figure 18 is a fragmentary sectional view showing one way of using the fastener of Figures 13, 14 and 15.

Figure 18 illustrates the application of the fastener of Figures 13, 14 and 15 in a manner similar to that just described with reference to the fastener of Figures 7, 8 and 9 and as illustrated in Figure 17. Like reference characters are used to designate like parts in this figure.

In Figure 18, since the holding portions 41 and 42 are bent so that they extend approximately at right angles to the length of the shank of the fastener, it will be understood that shoulders or abutments are thus provided by said portions that will firmly and positively engage the edges of the opening 62 in a manner to prevent the ready withdrawal of the fastener after it is applied to the opening 62 in the manner described in Figure 17.

Figure 19:
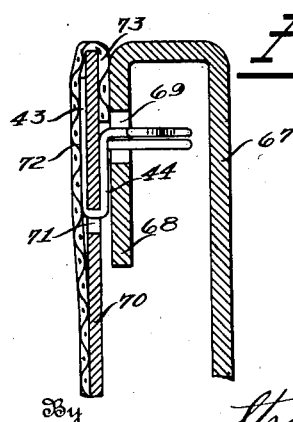
Figure 19 is a fragmentary sectional view showing one manner of applying the fastener of Figures 4, 5 and 6.

Figure 19 illustrates a preferred way of using the fastener of Figures 4, 5 and 6, or any fastener including a head in the form of a hook, as shown in these figures. Referring to Figure 19 a supporting structure 67 having a flange 68 to which trim material is to be attached, is provided with a fastener receiving opening 69. The foundation 70 of a trim panel, provided with an opening 71 which is covered by any suitable fabric or similar finish material 72, wrapped around the edge of the foundation, as indicated at 73, has the fastener assembled with respect to the foundation 70 after the covering material 73 has been applied thereto by inserting one arm of the hook-shaped head 43 through the opening 71, until the foundation adjacent said opening 71 is gripped between the arms 44 and 45 of the hook-shaped head and the portion 43 of said head. The trim material is then attached to the supporting structure by springing the shank of the hook 43, through the opening 69 in the manner above described. This arrangement permits the formation of the opening 71 at a point spaced substantially from the edge of the foundation and from the shank of the fastener, thus avoiding weakening of the edges of said foundation by the formation of openings close to the edge thereof, such as would be necessary in the constructions heretofore described in which the opening in the foundation is in alignment with an opening close to the edges of a supporting structure.

It will be understood that, if desired, the fastener may be used to secure covering material of any kind with or without the fabric trim material. If the fastener is used in such a way that the head thereof is visible, it is preferred to provide said head with a sheet-metallic cap such as illustrated in Figures 10, 11 and 12, providing heads that will completely cover the openings in the covering material through which the shank of the fastener extends.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are, therefore, intended to be embraced therein.

What I claim and desire to secure by United States Letters Patent is:—

1. A unitary spring stud fastener comprising a head, a shank, including a pair of spring arms bent away from the head a substantial distance in parallel planes normal to the head, each arm being then bent toward the head so as to provide an inclined surface shaped to cause said arm to swing in its plane when the shank of the fastener is entered in an aperture of a supporting structure, and an abutment on each arm between said surface and said head formed by bending the ends of said arms toward each other so as to present wide shoulders that are carried bodily inwardly toward each other as the shank of the fastener enters said aperture.

2. A one-piece spring stud fastener comprising a head, a shank including a pair of spring arms bent away from the head a substantial distance, means to prevent separational movement of said arms throughout a portion of their length while permitting swinging movement of the ends thereof remote from said head in parallel planes normal to said head when the shank of the fastener is entered in an aperture of a supporting structure, an inclined surface on each arm to cause it to swing in one of said planes as the shank of the fastener is passed through said aperture, and an abutment on each arm between said inclined surface and said head that is carried bodily inwardly as the shank of the fastener enters said aperture.

3. A one-piece spring stud fastener comprising a head, a shank including a pair of spring arms bent away from the head, a substantial distance and being twisted together throughout a portion only of their length to prevent separational movement of said arms adjacent said head, said arms being free to move independently beyond the twist that connects them adjacent said head, each arm being bent toward said head to provide an inclined surface arranged to cause said arm to swing in a plane normal to said head when the shank of the fastener is entered in an aperture, and being provided with an abutment swinging bodily with said arm and preventing ready withdrawal of the fastener when it has been entered in said aperture.

4. A spring stud fastener comprising a head, a shank consisting solely of a pair of spring arms arranged so as to swing in different planes and each of which is provided with a return-bend end that is relatively sharply bent first at an acute angle and away from and then continued toward the longitudinal axis of the shank of the fastener to provide a relatively wide abutment to prevent ready withdrawal of the fastener by firm engagement with a shoulder of a socket or aperture in a supporting structure.

5. A spring stud fastener comprising a head, a shank consisting solely of a pair of arms arranged so as to swing in different planes and each of which is provided with a return-bend end that is bowed outwardly with respect to the longitudinal axis of the shank of the fastener to provide an inclined guiding surface to cause said arm to swing when the shank of the fastener is caused to enter a socket and to provide an inclined holding surface between said head and said guiding surface.

6. The fastener defined in claim 5 in which said holding surface is formed substantially at right angles to the length of the shank of the fastener providing sharp relatively wide abutments preventing withdrawal of the fastener after it is entered in a socket or aperture in a supporting structure.

7. A fastener for securing covering material having an opening to a supporting structure having an opening extending through a wall thereof that is approximately in alinement with said first named opening, said fastener having a head bearing on said material around the opening therein, and a shank extending through the approximately alined openings, said shank including two spring arms disposed in side by side relation so as to be capable of passing each other and extending completely through said wall and substantially therebeyond, said arms being then bent toward the walls and shaped to provide inclined guiding surfaces to cause the arms to swing past each other in entering said shank in said openings and to provide abutments shaped to firmly engage the inside of said wall adjacent the opening therein when the fastener is in operative position.

8. A spring stud fastener complete in itself for securing trim panels or the like to a perforated supporting structure consisting of a head formed to engage the trim panel, and a shank comprising only two relatively stiff wire arms spaced laterally of each other so as to be independently movable and extending away from said head to the end of said shank and being then bent from said end toward said head to provide on each arm an inclined surface shaped to cause it to move in a plane normal to said head when the shank of the fastener is moved through a perforation in the supporting structure and to provide a holding surface of substantial extent to engage the portion of the supporting structure adjacent said perforation.

9. The combination defined in claim 7 in which said abutments are provided by bending the tips of said arms toward each other so that said tips are disposed approximately at right angles to the length of the shank of the fastener.

10. The combination defined in claim 7 in which the shank of the fastener as well as said arms are formed of two lengths of wire twisted together throughout a portion of their length, the remainder of said lengths beyond the twisted portions constituting said arms, guiding surfaces and abutments.

11. A spring stud fastener formed from a single piece of wire by bending the mid portion of the wire into the form of a loop constituting the head of the fastener, bending the ends of the wire away from said head to form the shank of the fastener, each end extending away from said head to the end of the shank remote from said head in parallel planes so as to be capable of moving past each other upon contraction of said shank and being then rebent toward the head, said rebent portions being bowed outwardly to provide guiding surfaces and abutments to prevent ready withdrawal of the fastener when sprung in an opening.

12. The combination defined in claim 11 in which portions of the wire between the head and the end of the shank of the fastener are secured together from adjacent the head to a point spaced substantially from the end of the shank, said portion being free to flex laterally adjacent the end of the shank.

13. The combination defined in claim 11 in which portions of the wire between the head and the end of the shank are twisted together from adjacent the head to a point spaced substantially from the end of the shank providing arms between the end of said twisted portions and the end of the shank that are free to flex laterally from said end of said twisted portions.

14. A spring stud fastener consisting of a head and a shank formed of wire, said shank consisting solely of a pair of arms disposed in crossed relation and each having portions thereof remote from said head bent toward said head and formed to provide guiding and holding portions shaped to respectively facilitate entry of the shank of the fastener in an opening or socket and to contact with a wall adjacent said opening or socket to prevent withdrawal of the fastener.

15. The combination defined in claim 14 in which said holding portions are disposed approximately parallel to the head of the fastener.

16. The combination defined in claim 14 in which said guiding and holding portions are formed by bowing outwardly the portions of the wire arms that are bent toward said head.

17. A spring stud fastener complete in itself comprising a flat head and a shank consisting only of a pair of relatively stiff arms arranged in parallel planes so that said arms are free to move past each other, each of said arms being formed at the end thereof remote from the head with inclined surfaces shaped to cause the arm to move in its plane when the shank of the fastener is snapped in a perforation in a supporting structure and being formed between said head and said end with an abutment presenting a relatively wide holding surface substantially parallel to said head.

18. The fastener defined in claim 17 in which the width of the shank at its widest point corresponds substantially to the width of said head.

BION C. PLACE.